US012088515B2

(12) United States Patent
Takada et al.

(10) Patent No.: US 12,088,515 B2
(45) Date of Patent: Sep. 10, 2024

(54) USER EQUIPMENT (71) Applicant: NTT DOCOMO, INC., Tokyo (JP)

(72) Inventors: Takuma Takada, Tokyo (JP); Hiroki Harada, Tokyo (JP); Naoki Fujimura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 512 days.

(21) Appl. No.: 17/431,129

(22) PCT Filed: Feb. 14, 2019

(86) PCT No.: PCT/JP2019/005410
§ 371 (c)(1),
(2) Date: Aug. 13, 2021

(87) PCT Pub. No.: WO2020/166018
PCT Pub. Date: Aug. 20, 2020

(65) Prior Publication Data
US 2022/0123878 A1 Apr. 21, 2022

(51) Int. Cl.
H04L 5/00 (2006.01)
(52) U.S. Cl.
CPC ............ *H04L 5/001* (2013.01); *H04L 5/0066* (2013.01); *H04L 5/0094* (2013.01); *H04L 5/0098* (2013.01)
(58) Field of Classification Search
CPC ..... H04L 5/001; H04L 5/0048; H04L 5/0066; H04L 5/0094; H04L 5/0098
See application file for complete search history.

(56) References Cited

U.S. PATENT DOCUMENTS

2013/0165126 A1 6/2013 Wei
2020/0163142 A1* 5/2020 Ryoo .................... H04W 76/15

FOREIGN PATENT DOCUMENTS

RU 2608747 C1 1/2017

OTHER PUBLICATIONS

International Search Report issued in PCT/JP2019/005410 on May 14, 2019 (1 page).
Written Opinion of the International Searching Authority issued in PCT/JP2019/005410 on May 14, 2019 (3 pages).
Huawei, HiSilicon; "Discussion on the remaining issues of UE measurement capability"; 3GPP TSG-RAN WG4 Meeting #89, R4-1815085; Spokane, US; Nov. 12-16, 2018 (4 pages).
MediaTek Inc.; "Selection of FR2 SCC for Neighboring Cell Search"; 3GPP TSG-RAN WG4 Meeting #89, R4-1814893; Spokane, WA, US; Nov. 12-16, 2018 (2 pages).

(Continued)

*Primary Examiner* — Zhensheng Zhang
(74) *Attorney, Agent, or Firm* — Osha Bergman Watanabe & Burton LLP (57) ABSTRACT A user equipment executes carrier aggregation using a plurality of component carriers allocated in a predetermined band in a predetermined frequency range (FR2). In a case where only a plurality of secondary component carriers is allocated in the predetermined band, the user equipment selects a secondary component carrier that is a reception quality measurement target among the plurality of secondary component carriers. In addition, the user equipment transmits a reception quality measurement result.

4 Claims, 6 Drawing Sheets (56) References Cited

OTHER PUBLICATIONS

Huawei, HiSilicon; "CR for measurement capability (section 9.2.3.2)"; 3GPP TSG-RAN WG4 #89, R4-1815084; Spokane, US; Nov. 12-16, 2018 (2 pages).
3GPP TS 38.133 V15.4.0; "3rd Generation Partnership Project; Technical Specification Group Radio Access Network; NR; Requirements for support of radio resource management (Release 15)"; Dec. 2018 (876 pages).
Office Action issued in Japanese Application No. 2020-572000, dated Nov. 15, 2022 (6 pages).
Office Action issued in counterpart Japanese Patent Application No. 2020-572000 mailed on Apr. 11, 2023 (9 pages).
3GPP TSG-RAN WG4 Meeting #89; R4-1814893 "Selection of FR2 SCC for Neighboring Cell Search" MediaTek Inc.; Spokane, WA, US; Nov. 12-16, 2018 (2 pages).
Office Action issued in Russian Application No. 2021125308/07; Dated Jul. 5, 2022 (12 pages).
Office Action issued in counterpart Chinese Patent Application No. 201980091791.4 mailed on Nov. 17, 2023 (16 pages).

* cited by examiner

USER EQUIPMENT

TECHNICAL FIELD

The present invention relates to radio communication, and more particularly, to a user equipment that executes carrier aggregation by using a plurality of component carriers.

BACKGROUND ART

The 3rd generation partnership project (3GPP) specifies long term evolution (LTE) and specifies LTE-Advanced (hereinafter, collectively referred to as LTE) for the purpose of further increasing the speed of LTE. Moreover, in the 3GPP, specification of a succeeding system of the LTE called 5G new radio (NR) or next generation (NG) has been considered.

Among these, in the 3GPP technology standard of Release 15, the number of cells, the number of synchronization signal (SS)/physical broadcast channel (PBCH) blocks (SSB) (the number of SSBs), and the like, of which a reception quality can be simultaneously monitored by a user equipment (UE) are defined for each frequency range (FR) (Non Patent Literature 1).

In particular, it is defined that the UE should monitor at least 24 SSBs on a single carrier of a serving cell with different SSB index and/or a physical cell ID (PCI) when using a predetermined band (intra-frequency) in FR2 (Section 9.2.3.2 of TS 38.133).

The monitoring of SSBs performed by the UE when using the intra-frequency in FR2 is defined on the premise that a transmission (radio base station) side is co-located.

For this reason, in a case of carrier aggregation (CA) using the intra-frequency in FR2, since it is assumed that a reception quality measured for each component carrier (CC), specifically, a value of reference signal received power (RSRP) does not differ greatly, it is sufficient that 24 SSBs on any secondary CC (SCC) are monitored in a case where no primary CC (PCC) and primary secondary CC (PSCC) exist, or no PCC and PSCC exist in the corresponding band in FR2, from the viewpoint of obtaining appropriate RSRP.

CITATION LIST

Non Patent Literature

Non Patent Literature 1: TS 38.133 V15.4.0, 3rd Generation Partnership Project;
Technical Specification Group Radio Access Network; NR; Requirements for support of radio resource management (Release 15), 3GPP, December 2018

SUMMARY OF INVENTION

However, the CA using the intra-frequency in FR2 has the following problems. Specifically, when neither the PCC nor the PSCC is included in the intra-frequency band in FR2, and only a plurality of SCCs is allocated, the UE cannot decide which SCC to select among the plurality of SCCs to monitor SSBs.

In a case where the UE selects an arbitrary SCC, the network may not be able to obtain appropriate RSRP based on which the reception quality of the entire CA can be judged.

Therefore, the present invention has been made in view of such a situation, and an object of the present invention is to provide a user equipment that can measure appropriate reception quality in carrier aggregation using an intra-frequency band in a predetermined frequency range (FR) at all times.

An aspect of the present invention is a user equipment (UE 200), and the user equipment executes carrier aggregation by using a plurality of component carriers (CCs 30) allocated in a predetermined band (intra-frequency) in a predetermined frequency range (FR2), and includes a control unit (control unit 230) that selects, in a case where only a plurality of secondary component carriers (SCCs) is allocated in the predetermined band, a secondary component carrier that is a reception quality measurement target among the plurality of secondary component carriers; and a transmitting unit (transmitting unit 210) that transmits a reception quality measurement result.

An aspect of the present invention is a user equipment (UE 200), and the user equipment executes carrier aggregation by using a plurality of component carriers allocated in a predetermined band in a predetermined frequency range, and includes a receiving unit (receiving unit 220) that receives, in a case where only a plurality of secondary component carriers is allocated in the predetermined band, configuration information specifying a secondary component carrier to become a reception quality measurement target among the plurality of secondary component carriers; and a transmitting unit (transmitting unit 210) that transmits a result of measuring a reception quality based on the configuration information.

DESCRIPTION OF EMBODIMENTS

Hereinafter, embodiments will be described with reference to the drawings. Note that the same functions or configurations are denoted by the same or similar reference numerals, and description thereof is omitted as appropriate.

(1) Overall Schematic Configuration of Radio Communication System

Figure 1:
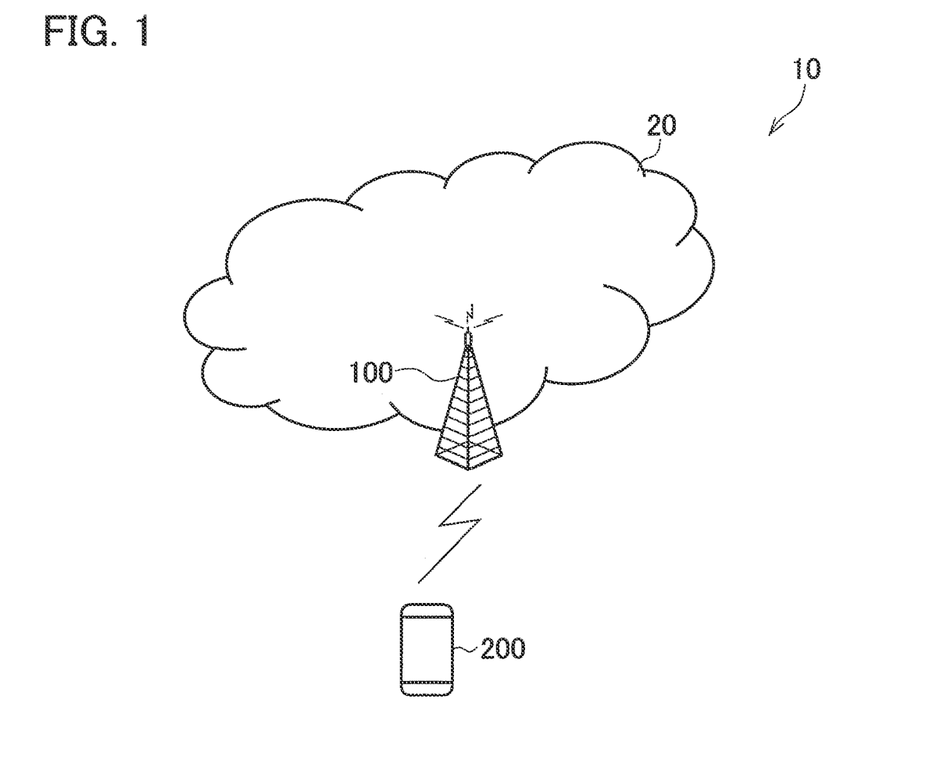
FIG. 1 is a diagram illustrating an overall schematic configuration of a radio communication system 10.

FIG. 1 is a diagram illustrating an overall schematic configuration of a radio communication system 10 according to the present embodiment. The radio communication system 10 is a radio communication system according to 5G new radio (NR), and includes a Next Generation-Radio Access Network 20 (hereinafter, referred to as NG-RAN 20) and a user equipment 200 (hereinafter, referred to as UE 200).

The NG-RAN 20 includes a radio base station 100 (hereinafter referred to as gNB 100). Note that a specific configuration of the radio communication system 10 such as the number of gNBs and the number of UEs is not limited to the example illustrated in FIG. 1.

The NG-RAN 20 actually includes a plurality of NG-RAN nodes, specifically, gNBs (or ng-eNBs), and is connected to a core network (5GC) (not illustrated) according to 5G. Note that the NG-RAN 20 and the 5GC may be simply referred to as a network.

The gNB 100 is a radio base station according to 5G, and performs radio communication with the UE 200 according to 5G. The gNB 100 and the UE 200 can support massive multiple-input and multiple-output (MIMO) in which a beam with higher directivity is formed by controlling a radio signal transmitted from a plurality of antenna elements, carrier aggregation (CA) in which a plurality of component carriers (CC) is used, dual connectivity (DC) in which component carriers are simultaneously transmitted between a plurality of NG-RAN nodes and the UE, and the like.

In the radio communication system 10, a plurality of frequency ranges (FR) are set. Specifically, FR1 and FR2 are set. In the present embodiment, FR1 and FR2 are as follows.

Frequency Range 1 (FR1): 450 to 6,000 MHz
Frequency Range 2 (FR2): 24,250 to 52,600 MHz A maximum channel bandwidth per CC in FR1 is 100 MHz (when a subcarrier spacing of 30 or 60 kHz is applied), and a maximum channel bandwidth per CC in FR2 is 400 MHz (when a subcarrier spacing of 120 kHz is applied).

The UE 200 executes the CA by using a plurality of CCs 30 (not illustrated in FIG. 1, see FIG. 3) allocated in a band (predetermined band) in FR1 or FR2 (predetermined frequency range).

(2) Functional Block Components of Radio Communication System

Next, functional block components of the radio communication system 10 will be described. Specifically, functional block components of the UE 200 will be described.

Figure 2:
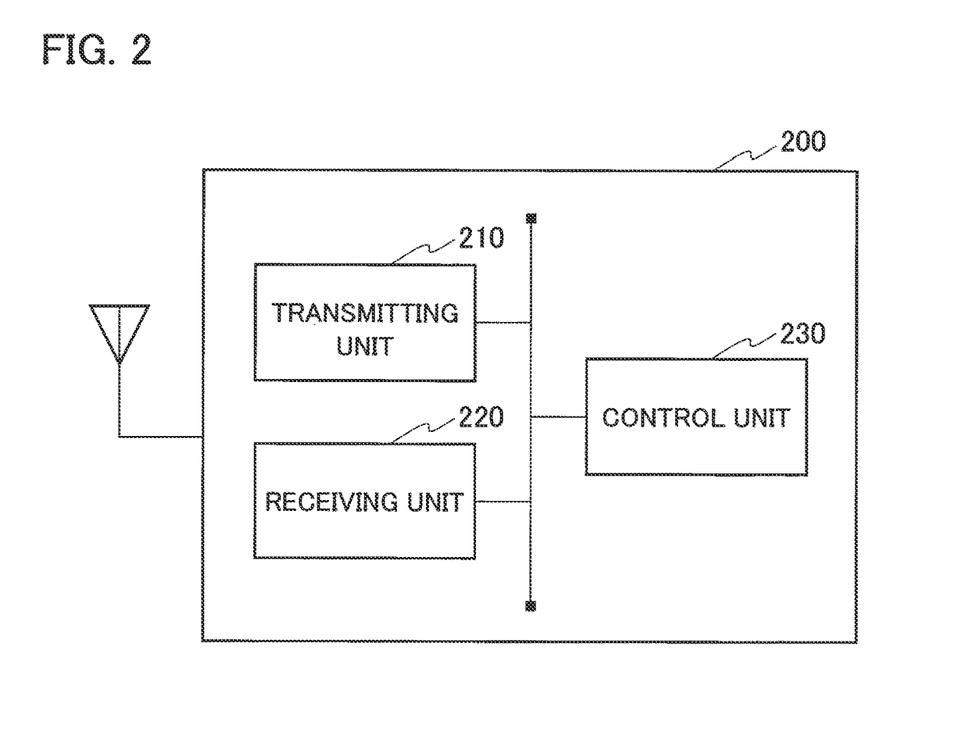
FIG. 2 is a diagram illustrating functional block components of a user equipment (UE) 200.

FIG. 2 is a diagram illustrating functional block components of the UE 200. As illustrated in FIG. 2, the UE 200 includes a transmitting unit 210, a receiving unit 220, and a control unit 230.

The transmitting unit 210 transmits an uplink signal (UL signal) according to NR. Further, the receiving unit 220 receives a downlink signal (DL signal) according to NR.

The control unit 230 performs a control on the UL signal transmitted by the transmitting unit 210 and the DL signal received by the receiving unit 220.

Specifically, the transmitting unit 210 transmits a UL signal configured with a plurality of CCs to the gNB 100, and the receiving unit 220 receives a DL signal configured with a plurality of CCs from the gNB 100. That is, the UE 200 executes carrier aggregation (CA) that realizes broadband communication by using a plurality of CCs simultaneously.

Figure 3:
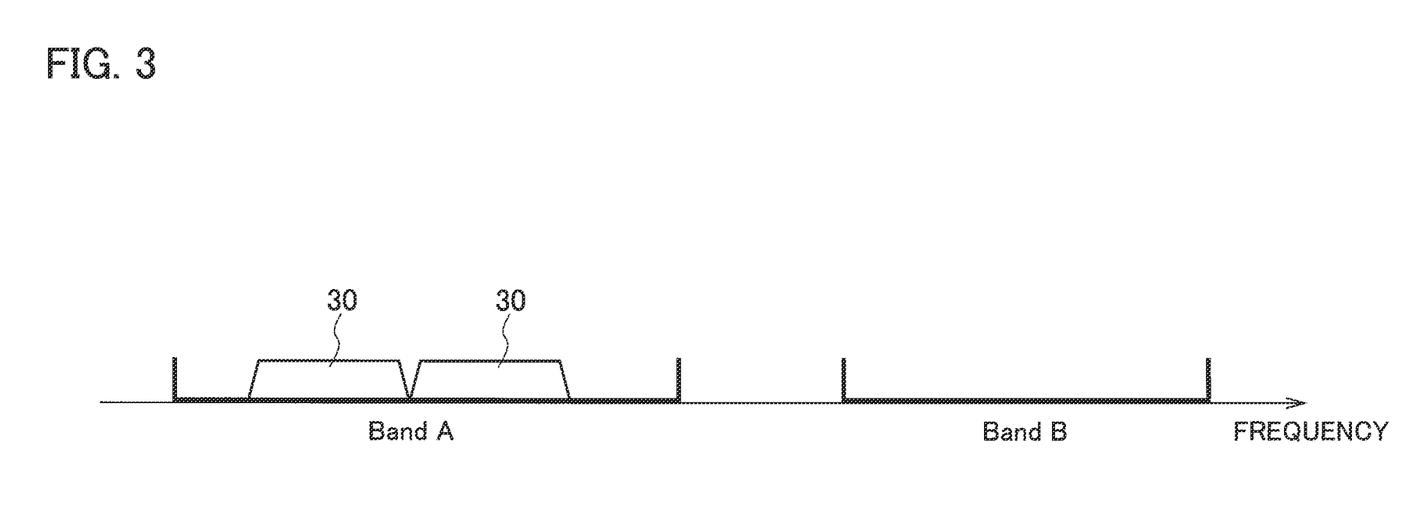
FIG. 3 is a diagram illustrating an example of allocation of component carriers (CC) to a predetermined band.

FIG. 3 illustrates an example of allocation of component carriers (CCs) to a predetermined band. In the allocation example illustrated in FIG. 3, a plurality of bands (frequency bands), specifically, Band A and Band B are set.

Further, in the allocation example, two CCs 30 are arranged contiguous to each other in the same band (Band A) on a frequency axis. The CA with the CCs 30 arranged in such a manner is called intra-band contiguous CA.

The control unit 230 controls the receiving unit 220 to monitor synchronization signal (SS)/physical broadcast channel (PBCH) blocks (SSBs) transmitted from the gNB 100 and another gNB (cell).

Figure 4:
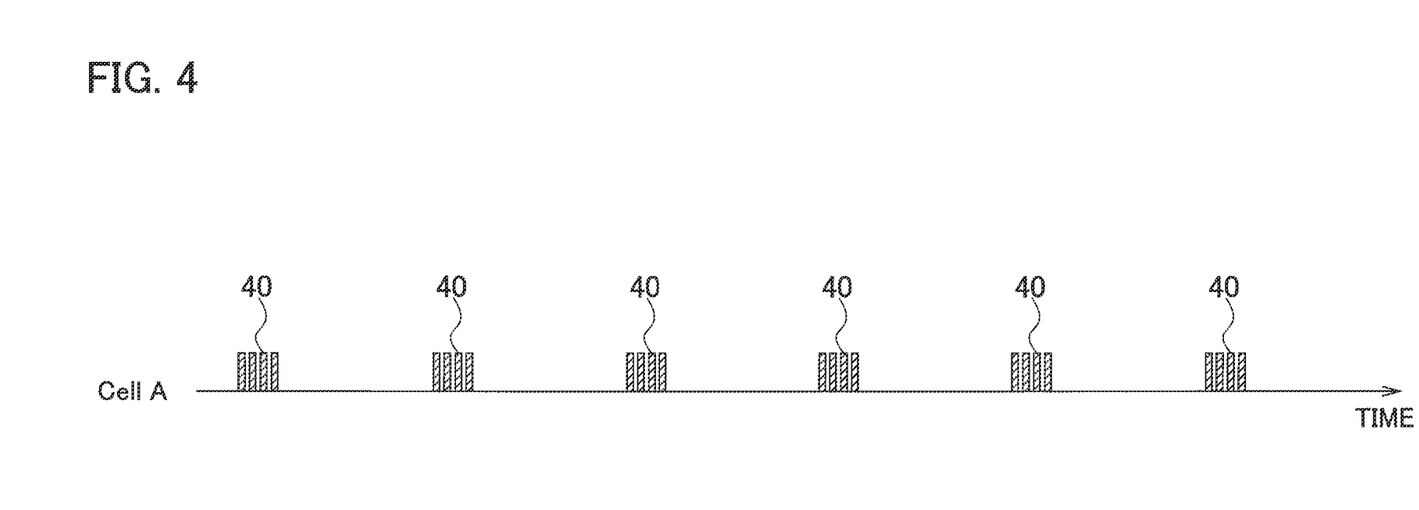
FIG. 4 is a diagram illustrating an example of a configuration of synchronization signal (SS)/physical broadcast channel (PBCH) blocks (SSBs) transmitted from a gNB 100 (or another gNB).

FIG. 4 illustrates a configuration example of SSBs transmitted from the gNB 100 (or another gNB). As illustrated in FIG. 4, an SSB 40 is transmitted from a cell (Cell A) formed by the gNB 100 (or another gNB) at a predetermined transmission interval (5, 10, 20, 40, 80, or 160 ms). That is, the SSB is transmitted at a predetermined transmission interval for each cell or CC.

The control unit 230 monitors a predetermined number of SSBs 40 transmitted at a predetermined interval as described above, and measures a reception quality of the CC 30.

Table 1 indicates the numbers of cells and SSBs (the number of beams) with different cell IDs (PCI) that can be simultaneously measured (monitored) by the UE 200.

TABLE 1

|  | FR1 | | FR2 | |
| --- | --- | --- | --- | --- |
|  | Number of Cells | Number of SSBs | Number of Cells | Number of SSBs |
| Intra-frequency | At least 8 | At least 14 | At least 6 | At least 24 At least 2 |
| Inter-frequency | At least 4 | At least 7 | At least 4 | At least 10 |

As indicated in Table 1, in a case of intra-frequency in FR2, the number of SSBs is specified with two patterns. This is due to the following reason.

First, according to the 3GPP technology standard of Release 15, it is difficult to simultaneously monitor a plurality of SSBs with different beam directions because the UE 200 can perform beamforming for reception in only one direction.

Note that the beamforming is a technique of forming a directivity pattern on a plurality of antennas by controlling the amplitude and phase of the antennas to increase/decrease an antenna gain in a specific direction.

Second, monitoring of the SSB performed by the UE 200 in a case of using the intra-frequency in FR2 is specified on the premise that a transmission (gNB) side is co-located at the same place.

Therefore, in a case of CA using the intra-frequency in FR2, since it is assumed that a value of reference signal received power (RSRP) measured for each CC does not differ greatly, it is sufficient that 24 SSBs on any secondary CC (SCC) are monitored in a case where no primary CC (PCC) and primary secondary CC (PSCC) exist, or no PCC and PSCC exist in the corresponding band in FR2, from the viewpoint of obtaining appropriate RSRP.

However, it is specified that at least two SSBs can be measured for reference signal received quality (RSRQ), even in a case of SSBs corresponding to other CCs for the purpose such as offloading.

Figure 5:
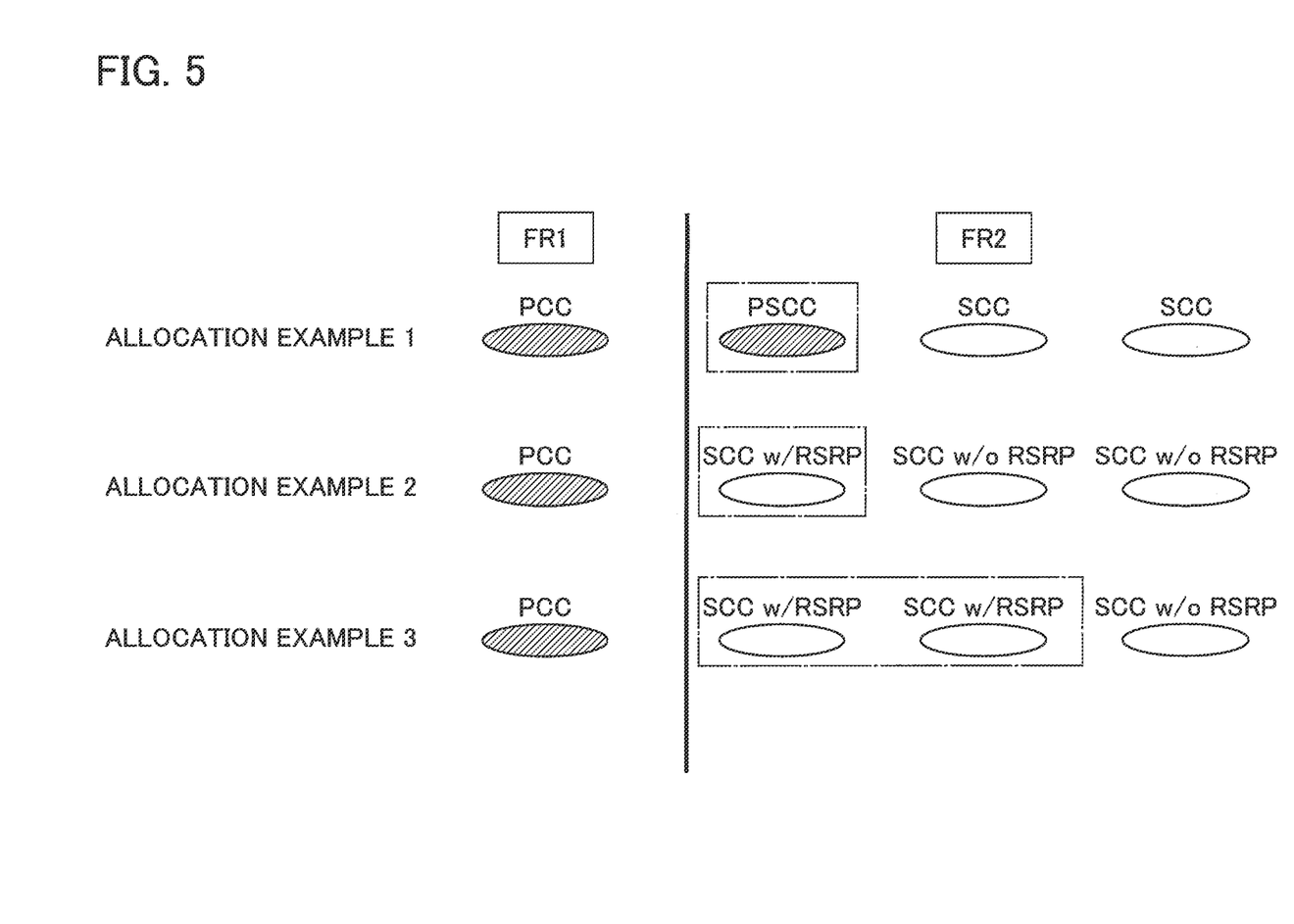
FIG. 5 is a diagram illustrating examples of allocation of component carriers (CCs) in carrier aggregation (CA) using frequency range 1 (FR1) and frequency range 2 (FR2).

FIG. 5 illustrates examples of allocation of component carriers (CCs) in CA using FR1 and FR2.

As illustrated in FIG. 5, a PCC, a PSCC, and a SCC (secondary component carrier) are allocated to FR1 and FR2. Note that the PCC may also be allocated to FR2, such that the CA is executed using only FR2. Note that the operation of the UE 200 according to the allocation example illustrated in FIG. 5 will be further described later.

In a case where only a plurality of SCCs is allocated in the predetermined band, specifically, the intra-frequency band in FR2, the control unit 230 selects an SCC that is a reception quality measurement target among the plurality of SCCs. Specifically, the control unit 230 selects an SCC that is an RSRP measurement target.

The control unit 230 monitors an SSB transmitted using the selected SCC, and measures RSRP.

The transmitting unit 210 transmits an RSRP measurement result. Specifically, the transmitting unit 210 transmits a measured RSRP value (or a rank of the measured value) to the gNB 100.

In addition, in a case where a plurality of SCCs that is RSRP measurement targets exists, the control unit 230 may select one of the SCCs that are the measurement targets.

Specifically, in a case where a plurality of SCCs that is RSRP measurement targets exists in the intra-frequency band in FR2, the control unit 230 can arbitrarily select one of the SCCs. In other words, the criteria based on which the UE 200 selects any SCC may not be particularly specified, and may be left to implementation.

Further, the receiving unit 220 can receive configuration information specifying an SCC to become a reception quality measurement target, specifically, an RSRP measurement target.

The configuration information specifies an SCC to become a reception quality measurement target among a plurality of SCCs in a case where only the plurality of SCCs is allocated to the intra-frequency band (predetermined band) in FR2. Examples of the configuration information can include MeasConfig that is an information element defined in 3GPP TS 38.331 can be used.

The control unit 230 monitors an SSB corresponding to the SCC selected based on the configuration information, and measures RSRP. Further, the transmitting unit 210 transmits a result of the RSRP measurement performed based on the configuration information to the gNB 100.

(3) Operation of Radio Communication System

Next, operation of the radio communication system 10 will be described. Specifically, an operation of selecting a secondary component carrier (SCC) to become a target of reception quality measurement performed by the UE 200 will be described.

(3.1) Examples of Allocation of Component Carrier

As described above, FIG. 5 illustrates examples of allocation of component carriers (CCs) in CA using the intra-frequency in FR1 and intra-frequency in FR2. Specifically, FIG. 5 illustrates three allocation examples.

In Allocation Example 1, a PCC is allocated to FR1, and a PSCC and a plurality of SCCs are allocated to FR2.

In Allocation Example 2, a PCC is allocated to FR1, and a plurality of SCCs are allocated to FR2. That is, no PSCC is allocated to FR2. In addition, in Allocation Example 2, an SCC (SCC w/RSRP in FIG. 5) that is an RSRP measurement target is included. Note that in Allocation Example 2, SCCs (SCC w/o RSRP in FIG. 5) that are not RSRP measurement targets are also included.

In Allocation Example 3, a PCC is allocated to FR1, and a plurality of SCCs are allocated to FR2 as in Allocation Example 2. In Allocation Example 3, a plurality (two) of SCCs (SCC W/RSRP in FIG. 5) that is RSRP measurement targets is included.

Hereinafter, details of the operation of selecting a secondary component carrier (SCC) to become a target of reception quality measurement performed by the UE 200 according to a state of CC allocation to at least one of FR1 or FR2 of CC, such as Allocation Examples 1 to 3, will be described.

(3.2) SCC Selection Operation Flow

Figure 6:
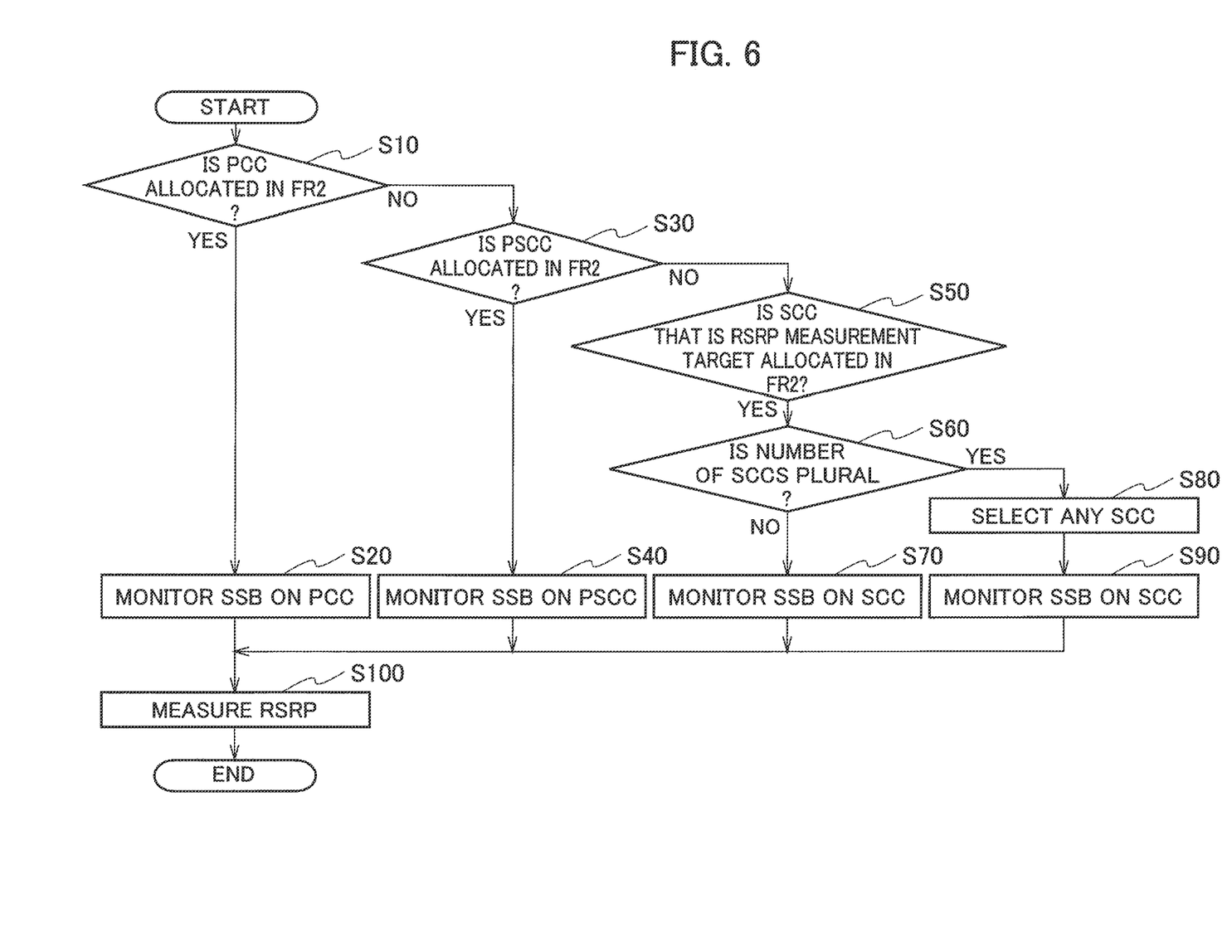
FIG. 6 is a diagram illustrating an SCC selection operation flow performed by the UE 200.

FIG. 6 illustrates an SCC selection operation flow performed by the UE 200. As illustrated in FIG. 6, the UE 200 determines whether or not a PCC is allocated to FR2 (S10).

In a case where a PCC is allocated to FR2, the UE 200 monitors an SS/PBCH Block (SSB) on the PCC, that is, an SS/PBCH Block (SSB) corresponding to the PCC (S20).

Specifically, the UE 200 monitors 24 SSBs according to specification for the intra-frequency band in FR2 (see Table 1) (the same applies to the following). As described above, in a case of CA using the intra-frequency in FR2, it is assumed that the transmission (gNB) side is co-located at the same place, and thus it is sufficient to monitor 24 SSBs on the selected CC, and measure RSRP.

In a case where no PCC is allocated to FR2, the UE 200 determines whether or not a PSCC is allocated to FR2 (S30).

In a case where the PSCC is allocated to FR2, the UE 200 monitors 24 SSBs on the PSCC (S40). Such an allocation state corresponds to Allocation Example 1 of FIG. 5.

In a case where no PSCC is allocated to FR2, the UE 200 determines whether or not an SCC that is an RSRP measurement target is allocated to FR2 (S50).

In a case where the SCC that is an RSRP measurement target is allocated to FR2, the UE 200 determines whether or not the number of SCCs, that is, the number of SCCs that are RSRP measurement targets is plural (S60).

In a case where the number of SCCs that are RSRP measurement targets is only one, the UE 200 monitors 24 SSBs on the SCC, that is, 24 SSBs corresponding to the SCC (S70). Such an allocation state corresponds to Allocation Example 2 in FIG. 5.

In a case where the number of SCCs that are RSRP measurement targets is plural, the UE 200 selects an arbitrary SCC among the plurality of SCCs (S80). Such an allocation state corresponds to Allocation Example 3 in FIG. 5.

Further, the UE 200 monitors 24 SSBs on the selected SCC (S90).

The UE 200 monitors the selected SSB and measures RSRP (S100).

Note that in the selection operation flow of FIG. 5, the determination is made in the order of the PCC, the PSCC, and the SCC, but the order may be changed as appropriate.

(3.3) Notification of Configuration Information from Network

Figure 7:
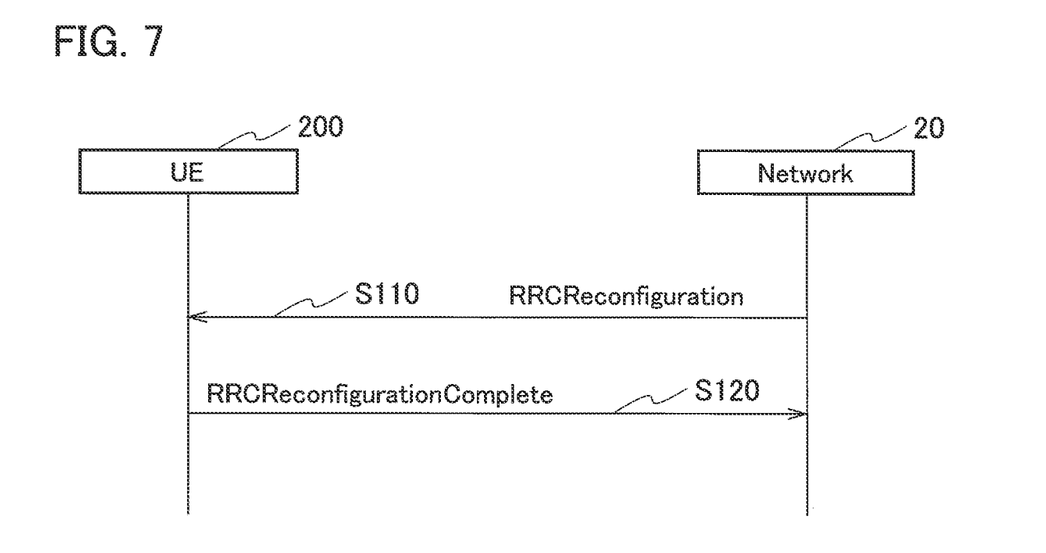
FIG. 7 is a diagram illustrating an example of a message transmission and reception sequence in a radio resource control layer (RRC layer).

FIG. 7 illustrates an example of a message transmission and reception sequence in a radio resource control layer (RRC layer).

As illustrated in FIG. 7, the network (specifically, the NG-RAN 20) transmits RRC Reconfiguration to the UE 200 (S110).

RRC Reconfiguration includes MeasConfig, which is an information element indicating a configuration content related to measurement in the UE 200. In particular, in the present embodiment, MeasConfig includes configuration information specifying an SCC to become an RSRP measurement target.

The UE 200 receiving RRC Reconfiguration may select an SCC to become an RSRP measurement target based on the configuration information. In this case, the SCC selection operation flow illustrated in FIG. 6 is not applied.

The UE 200 performs processing based on a content of RRC Reconfiguration, and returns RRC Reconfiguration Complete to the network (S120).

(4) Action/Effect

According to the above-described embodiment, the following effects can be obtained. Specifically, in a case where only a plurality of SCCs is allocated to the intra-frequency band in FR2, the UE 200 selects an SCC that is an RSRP measurement target among the plurality of SCCs.

The SCC that is an RSRP measurement target is extremely suitable as a CC for judging the reception quality of the entire CA. That is, the UE 200 can select a component carrier that is an appropriate monitoring target in the intra-frequency band in FR2 (predetermined frequency range) at all times.

Therefore, the UE 200 can measure an appropriate reception quality in carrier aggregation using the intra-frequency in FR2 at all times. As a result, it is possible to avoid a reception quality measurement result unintended by the network from being reported from the UE 200, and more appropriate operation of the entire radio communication system 10 can be promoted.

In the present embodiment, the UE 200 selects an SCC that is an RSRP measurement target. Therefore, the network can surely obtain information sufficient for judging the reception quality of the entire CA using the intra-frequency in FR2.

In the present embodiment, in a case where a plurality of SCCs that is reception quality (RSRP) measurement targets exists, the UE 200 selects one of the SCCs that are reception quality measurement targets. Therefore, even in a case where a plurality of SCCs exists, the reception quality can surely be measured.

In the present embodiment, the UE 200 can receive configuration information specifying an SCC to become a reception quality (RSRP) measurement target. Therefore, an SCC to become a reception quality measurement target can be specified, led by the network. This allows flexible selection of an SCC to become a measurement target, in consideration of a state of the radio communication system 10 and the like.

(5) Other Embodiments

Although the contents of the present invention have been described above with reference to the embodiment, the present invention is not limited to these descriptions, and it is obvious to those skilled in the art that various modifications and improvements can be made.

For example, in the above-described embodiment, RSRP is measured as the reception quality, but the reception quality may include, for example, RSRQ and signal-to-interference plus noise power ratio (SINR), in addition to RSRP.

Moreover, the block diagram (FIG. 2) used for describing the embodiments illustrates blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is called a transmitting unit or a transmitter. For any of the above, as described above, the realization method is not particularly limited to any one method.

Figure 8:
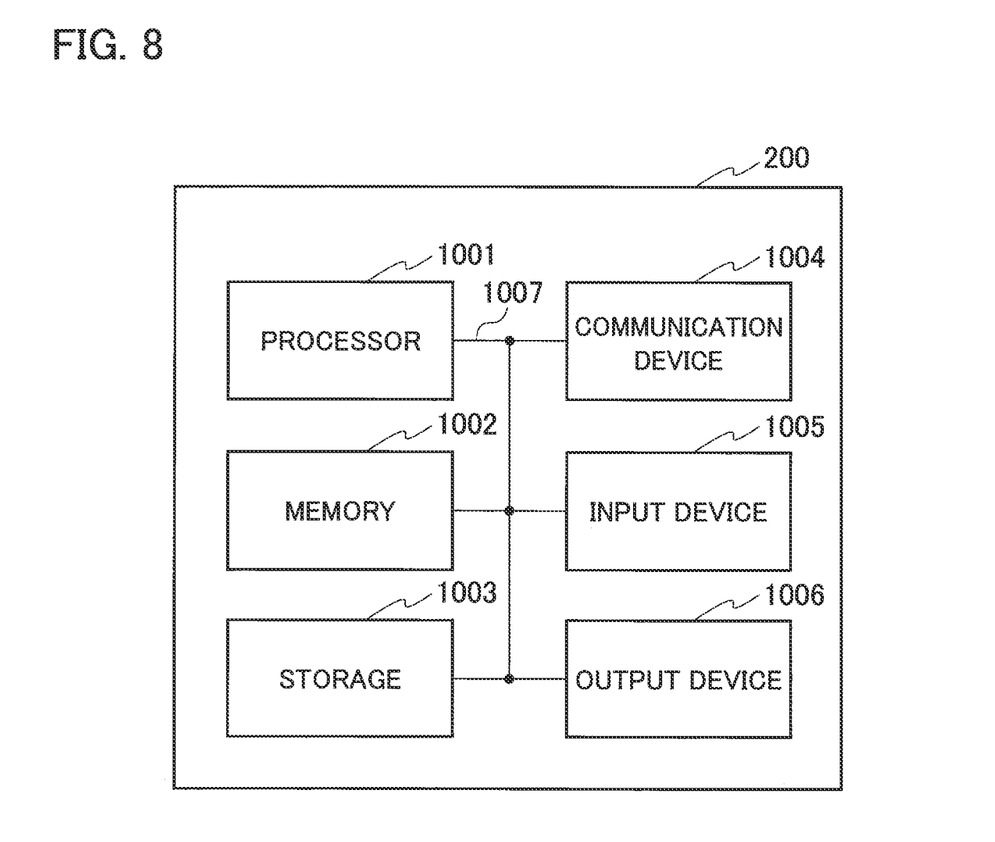
FIG. 8 is a diagram illustrating an example of a hardware configuration of the UE 200.

Furthermore, the UE 200 described above may function as a computer that performs the processing of the radio communication method of the present disclosure. FIG. 8 is a diagram illustrating an example of a hardware configuration of the UE 200. As illustrated in FIG. 8, the UE 200 can be configured as a computer device including a processor 1001, a memory 1002, a storage 1003, a communication device 1004, an input device 1005, an output device 1006, a bus 1007, and the like.

Furthermore, in the following description, the term "device" can be replaced with a circuit, device, unit, and the like. A hardware configuration of the device may be constituted by including one or plurality of the devices illustrated in the figure, or may be constituted without including some of the devices.

The functional blocks (see FIG. 2) of the UE 200 are realized by any of hardware elements of the computer device or a desired combination of the hardware elements.

Moreover, the processor 1001 performs operation by loading a predetermined software (program) on hardware such as the processor 1001 and the memory 1002, controls communication via the communication device 1004, and controls reading and/or writing of data on the memory 1002 and the storage 1003, thereby realizing various functions of the UE 200.

The processor 1001, for example, operates an operating system to control the entire computer. The processor 1001 may be configured with a central processing unit (CPU) including an interface with a peripheral device, a control device, an operation device, a register, and the like.

Moreover, the processor 1001 reads a program (program code), a software module, data, and the like from the storage 1003 and/or the communication device 1004 into the memory 1002, and executes various processing according to the data. As the program, a program that is capable of executing on the computer at least a part of the operation described in the above embodiments is used. Alternatively, various processing described above may be executed by one processor 1001 or may be executed simultaneously or sequentially by two or more processors 1001. The processor 1001 may be implemented by using one or more chips. Alternatively, the program may be transmitted from a network via a telecommunication line.

The memory 1002 is a computer readable recording medium and may be configured, for example, with at least one of read only memory (ROM), erasable programmable ROM (EPROM), electrically erasable programmable ROM (EEPROM), random access memory (RAM), and the like. The memory 1002 may be called register, cache, main memory (main storage device), and the like. The memory 1002 can store therein a program (program codes), software modules, and the like that can execute the method according to the embodiment of the present disclosure.

The storage 1003 is a computer readable recording medium. Examples of the storage 1003 include an optical disk such as compact disc ROM (CD-ROM), a hard disk drive, a flexible disk, a magneto-optical disk (for example, a compact disk, a digital versatile disk, and Blu-ray (registered trademark) disk), a smart card, a flash memory (for example, a card, a stick, and a key drive), a floppy (registered trademark) disk, a magnetic strip, and the like. The storage 1003 may be called an auxiliary storage device. The recording medium may be, for example, a database including the memory 1002 and/or the storage 1003, a server, or other appropriate media.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 may include a radio-frequency switch, a duplexer, a filter, a frequency synthesizer, and the like in order to realize, for example, at least one of frequency division duplex (FDD) and time division duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 may be constituted by a single bus or may be constituted by separate buses between the devices.

Further, the device may be configured to include hardware such as a microprocessor, a digital signal processor (DSP), an application specific integrated circuit (ASIC), a programmable logic device (PLD), and a field programmable gate array (FPGA). Some or all of these functional blocks may be realized by the hardware. For example, the processor 1001 may be implemented by using at least one of these hardware.

Notification of information is not limited to that described in the above aspect/embodiment, and may be performed by using a different method. For example, the notification of information may be performed by physical layer signaling (for example, downlink control information (DCI), uplink control information (UCI), higher layer signaling (for example, RRC signaling, medium access control (MAC) signaling, broadcast information (master information block (MIB) and system information block (SIB)), other signals, or a combination thereof. The RRC signaling may be called an RRC message, for example, or may be an RRC Connection Setup message, an RRC Connection Reconfiguration message, or the like.

Each of the above aspects/embodiments may be applied to at least one of long term evolution (LTE), LTE-advanced (LTE-A), SUPER 3G, IMT-Advanced, 4th generation mobile communication system (4G), 5th generation mobile communication system (5G), future radio access (FRA), new radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods described above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal can be performed by at least one of the base station and other network nodes other than the base station (for example, MME, S-GW, and the like may be considered, but not limited thereto). In the above, an example in which there is one network node other than the base station is described; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input/output information may be stored in a specific location (for example, a memory) or may be managed in a management table. The information to be input/output can be overwritten, updated, or added. The information may be deleted after outputting. The inputted information may be transmitted to another device.

The determination may be made by a value (0 or 1) represented by one bit or by a Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, and it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when software is transmitted from a website, a server, or some other remote source by using at least one of a wired technology (coaxial cable, optical fiber cable, twisted pair, digital subscriber line (DSL), or the like) and a wireless technology (infrared light, microwave, or the like), at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (CC) may be referred to as a carrier frequency, a cell, a frequency carrier, or the like.

The terms "system" and "network" used in the present disclosure are used interchangeably.

Furthermore, the information, the parameter, and the like described in the present disclosure may be represented by an absolute value, may be expressed as a relative value from a predetermined value, or may be represented by corresponding other information. For example, the radio resource may be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information elements can be identified by any suitable name, the various names assigned to these various channels and information elements shall not be restricted in any way.

In the present disclosure, it is assumed that "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, a communication service can be provided by a base station subsystem (for example, a small base station for indoor use (remote radio head: RRH)).

The term "cell" or "sector" refers to a part or all of the coverage area of a base station and/or a base station subsystem that performs the communication service in this coverage.

In the present disclosure, the terms "mobile station (MS)", "user terminal", "user equipment (UE)", "terminal" and the like can be used interchangeably.

The mobile station may be called by those skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an internet of things (IoT) device such as a sensor.

Also, a base station in the present disclosure may be read as a mobile station (user terminal, hereinafter the same applies). For example, each of the aspects/embodiments of the present disclosure may be applied to a configuration that allows communication between a base station and a mobile station to be replaced with communication between a plurality of mobile stations (which may be referred to as, for example, device-to-device (D2D), vehicle-to-everything (V2X), or the like). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be read as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency region, the microwave region, and the light (both visible and invisible) region, and the like.

The reference signal may be abbreviated as RS and may be called pilot according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in the present disclosure, these articles may include a plurality of nouns following these articles.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
30 CC
40 SSB
100 gNB
200 UE
210 Transmitting unit
220 Receiving unit
230 Control unit
1001 Processor
1002 Memory
1003 Storage
1004 Communication device
1005 Input device
1006 Output device
1007 Bus

The invention claimed is:

1. A terminal that executes carrier aggregation by using a plurality of component carriers allocated in a band in a frequency range, the terminal comprising:
   a control unit that selects, in a case where only a plurality of secondary component carriers is allocated in the band and a network specifies one secondary component carrier that is a reception quality measurement target among the plurality of secondary component carriers, the one secondary component carrier, and
   selects, in a case where the network specifies two or more secondary component carriers that are reception quality measurement targets among the plurality of secondary component carriers, one secondary component carrier that is the reception quality measurement target among the two or more secondary component carriers specified by the network according to an implementation of the terminal; and
   a transmitting unit that transmits a reception quality measurement result.

2. The terminal according to claim 1, wherein the control unit selects the one secondary component carrier that is a reference signal received power measurement target.

3. A radio communication method comprising:
   executing, at a terminal, carrier aggregation by using a plurality of component carriers allocated in a band in a frequency range;
   selecting, in a case where only a plurality of secondary component carriers is allocated in the band and a network specifies one secondary component carrier, the one secondary component carrier that is a reception quality measurement target among the plurality of secondary component carriers;
   selecting, in a case where the network specifies two or more secondary component carriers that are reception quality measurement targets among the plurality of secondary component carriers, one secondary component carrier that is the reception quality measurement target among the two or more secondary component carriers specified by the network according to an implementation of the terminal; and
   transmitting a reception quality measurement result.

4. A radio communication system including a terminal and a radio base station, comprising:
   the terminal that executes carrier aggregation by using a plurality of component carriers allocated in a band in a frequency range, the terminal comprises:
      a control unit that selects, in a case where only a plurality of secondary component carriers is allocated in the band and a network specifies one secondary component carrier that is a reception quality measurement target among the plurality of secondary component carriers, the one secondary component carrier, and
      selects in a case where the network specifies two or more secondary component carriers that are reception quality measurement targets among the plurality of secondary component carriers, one secondary component carrier that is the reception quality measurement target among the two or more secondary component carriers specified by the network according to an implementation of the terminal; and
      a transmitting unit that transmits a reception quality measurement result; and
   the radio base station comprises a receiving unit that receives the reception quality measurement result.

* * * * *